United States Patent [19]
Heneka et al.

[11] Patent Number: 6,095,618
[45] Date of Patent: Aug. 1, 2000

[54] SEGMENTED BRAKE PIPE TRAIN CONTROL SYSTEM AND RELATED METHODS

[75] Inventors: Steven P. Heneka, Palm Bay; Andrew T. Powshok, Indian Harbor Beach; Eugene A. Smith, Jr., Palm Bay, all of Fla.

[73] Assignee: GE-Harris Railway Electronics, L.L.C.

[21] Appl. No.: 09/272,543

[22] Filed: Mar. 19, 1999

Related U.S. Application Data
[60] Provisional application No. 60/078,564, Mar. 19, 1998.

[51] Int. Cl.$^7$ .................................................. B60T 13/74
[52] U.S. Cl. ........................... 303/3; 303/15; 246/182 R; 246/167 R; 246/182 A
[58] Field of Search ............................... 303/3, 15, 7, 86, 303/66, 81, 82, 77; 246/167 R, 182 A, 182 R

[56] References Cited

U.S. PATENT DOCUMENTS

| | | | |
|---|---|---|---|
| 4,553,723 | 11/1985 | Nichols et al. | 246/167 R |
| 4,582,280 | 4/1986 | Nichols et al. | 246/182 R |
| 5,056,873 | 10/1991 | Deno et al. | 303/66 |
| 5,383,717 | 1/1995 | Fernandez et al. | 303/3 |
| 5,393,129 | 2/1995 | Troiani et al. | 303/3 |
| 5,722,736 | 3/1998 | Cook | 303/15 |
| 5,738,417 | 4/1998 | Wood et al. | 303/3 |
| 5,788,339 | 8/1998 | Wood et al. | 303/3 |

*Primary Examiner*—Robert J. Oberleitner
*Assistant Examiner*—Devon Kramer
*Attorney, Agent, or Firm*—Scott Hayden; John S. Beulick; Patrick W. Rasche

[57] ABSTRACT

A train control system is for a train comprising at least first and second train segments including a brake pipe being separated between adjacent train segments. The train control system preferably comprises a first control subsystem for installation in a locomotive of the first train segment and a second control subsystem for installation in a locomotive of the second train segment. The first and second control subsystems communicate with one another for controlling train braking. The system also preferably includes a third control subsystem for installation in a railcar adjacent an end of the first train segment. This third control subsystem preferably includes at least one pressure transducer for sensing brake pipe pressure adjacent the end of the first train segment, and at least one control valve for controlling brake pipe pressure adjacent the end of the first train segment. The third control subsystem also preferably includes a processor for communicating a signal related to brake pipe pressure adjacent the end of the first train segment to the second control subsystem, and for controlling brake pipe pressure adjacent the end of the first train segment responsive to a command from the second control subsystem. The second control subsystem and the third control subsystem preferably cooperate so that the brake pipe pressure adjacent the end of the first train segment and a brake pipe pressure adjacent a front of the second train segment are substantially matching thereby emulating operation with a continuous brake pipe.

33 Claims, 13 Drawing Sheets

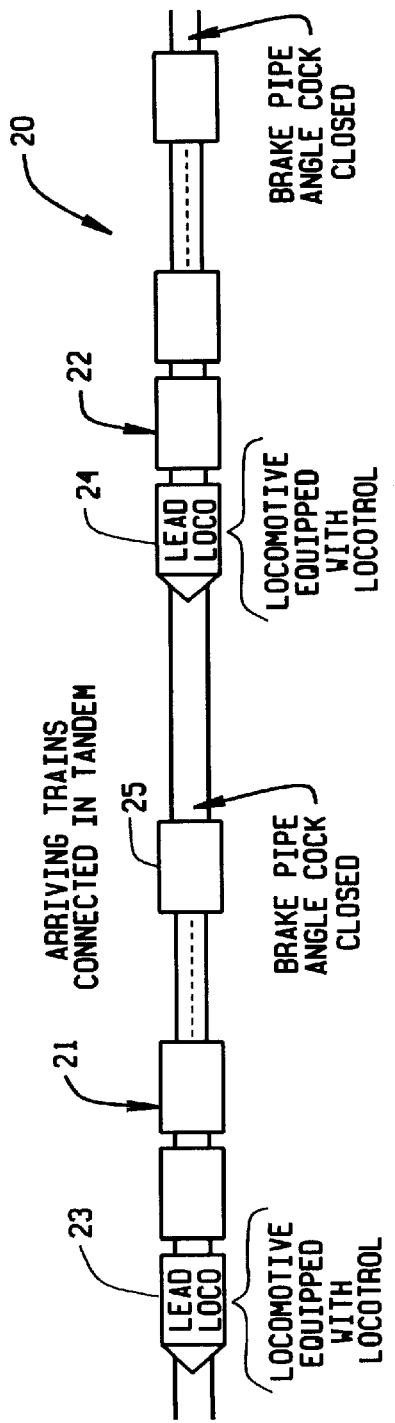
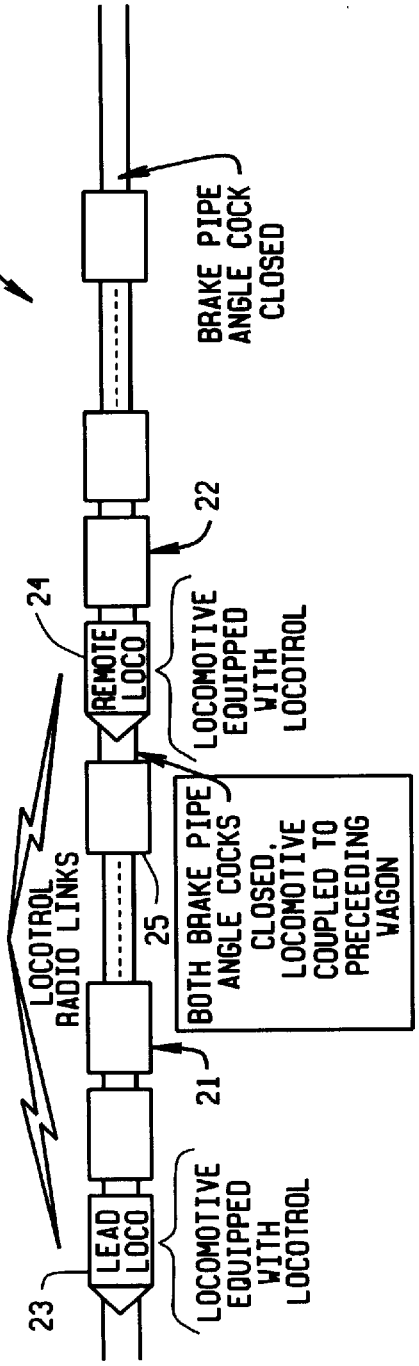

SEGMENTED BRAKE PIPE TRAIN CONTROL SYSTEM AND RELATED METHODS

RELATED APPLICATION

This application is based upon prior filed provisional application Ser. No. 60/078,564 filed Mar. 19, 1998, the entire disclosures of which is incorporated herein by reference.

FIELD OF THE INVENTION

The present invention relates to the field of train equipment, and, more particularly, to train braking equipment and associated methods.

BACKGROUND OF THE INVENTION

Trains are widely used to transport people and freight. Freight trains in particular may be relatively long and include several groups of locomotives (consists). For example, a freight train may be a mile long or more. Coordination is required for operating the locomotives to ensure proper traction and braking, for example.

U.S. Pat. Nos. 4,582,280 and 4,553,723 to Nichols et al. are seminal patents directed to a radio communication based train control system. The radio communication system is for a lead unit and a plurality of remote units. The system includes a protocol for establishing a communication link between the lead unit and the one or more remote units. The protocol prevents any of the units in the system from processing messages or commands from other units in other train systems or processing messages or commands originating from units with the train system but which are addressed to other units. A communications channel contention feature is provided for minimizing the probability of multiple units within the system from transmitting on the common communications channel at the same time. In addition, the system insures that the highest priority communications are transmitted first in time. The control system provides for the coordinated control of the air braking functions in the train.

Another application of computer based control systems relates to so-called "distributed power" (DP) functions. Such distributed power functions typically control locomotive tractive effort and dynamic braking as well as air brakes. In particular, GE HARRIS Railway Electronics, L.L.C. offers a radio based control system under the designation LOCOTROL® which provides coordinated distributed power and air brake control of the remote locomotives from the lead locomotive. The system controls tractive effort and braking effort for up to four consists for all types of freight over all types of terrain. Each equipped unit can be operated as a lead or a remote unit.

In certain applications it may be desirable to at least temporarily operate a train comprising two or more train segments, with each segment including at least one locomotive and plurality of railcars. For example, such train segments can be joined at an initial marshaling point and operated together for a portion of a journey. At another point, the individual train segments are disassembled and each train segment proceeds to its intended destination.

A typical train requires a continuous brake pipe connecting all locomotives and cars along the train. For the above described segmented train, the brake pipe in the past would typically be connected between the last car of a preceding segment with the next locomotive of the following train segment. Connecting the brake pipe and later disconnecting the brake pipe leads to considerable effort and manpower. Both assembly and later disassembly of the train segments are unnecessarily complicated by the traditional need for brake pipe continuity.

In the setting of a helper locomotive used to temporarily assist a train up an incline, for example, U.S. Pat. No. 5,383,717 to Fernandez et al. discloses that the helper locomotive may be equipped with a head-of-train (HOT) unit, and the car just prior to helper locomotive is equipped with an end-of-train (EOT) unit. The lead locomotive at the front of the train is also equipped with a HOT unit. The brake pipe is stopped at the last car so that the brake pipe of the helper locomotive is separate from the rest of the train. Accordingly, the helper unit can more readily connect and disconnect from the train. The EOT unit communicates to the HOT unit of the helper locomotive and to the HOT of the lead locomotive. The EOT unit allows the helper locomotive to operates its brakes based upon mirroring the brake pipe pressure seen by the EOT unit.

Unfortunately, radio communication between the EOT unit and the HOT unit of the lead locomotive can be disrupted, as when the train passes a curve or passes through a tunnel, for example. Other conditions may also cause less efficient operation of the brakes between the train and the helper locomotive. In addition, there is no coordination between the motive power of the locomotives of the train and the helper locomotive. Accordingly, potentially damaging forces may be generated between portions of the train.

SUMMARY OF THE INVENTION

In view of the foregoing background, it is therefore an object of the present invention to provide a train control system and method facilitating assembly, disassembly and operation of a plurality of train segments in a coordinated fashion.

This and other objects, features and advantages in accordance with the present invention are provided by a train control system for a train comprising at least first and second train segments including a brake pipe being separated between adjacent train segments. The train control system preferably comprises a first control subsystem for installation in a locomotive of the first train segment and a second control subsystem for installation in a locomotive of the second train segment. The first and second control subsystems communicate with one another for controlling train braking and/or motive power.

The system also preferably includes a third control subsystem for installation in a railcar adjacent an end of the first train segment. This third control subsystem preferably includes at least one pressure transducer for sensing brake pipe pressure adjacent the end of the first train segment, and at least one control valve for controlling brake pipe pressure adjacent the end of the first train segment. The third control subsystem also preferably includes a processor for communicating a signal related to brake pipe pressure adjacent the end of the first train segment to the second control subsystem, and for controlling brake pipe pressure adjacent the end of the first train segment responsive to a command from the second control subsystem.

The second control subsystem and the third control subsystem preferably cooperate so that the brake pipe pressure adjacent the end of the first train segment and a brake pipe pressure adjacent a front of the second train segment are substantially matching thereby emulating operation with a continuous brake pipe. Accordingly, coordination of the braking between the first train segment and the second train segment is achieved, and the assembly and disassembly of train segments is enhanced by not requiring connection and later disconnection of the brake pipe between adjacent train segments.

According to one aspect of the invention, the second control subsystem may command a brake pipe pressure reduction to the third control subsystem responsive to the first control subsystem. Efficiency and speed of braking is thereby enhanced while also avoiding potentially high forces between the first and second train segments.

According to another aspect of the invention, the third control subsystem may communicate a signal relating to a brake pipe pressure reduction in the first train segment to the second control subsystem when radio communication between the first control subsystem and second control subsystem is disrupted. In one variation, the first and second control subsystems further control motive power. In this variation, the second control subsystem causes the second locomotive to idle down responsive to the brake pipe pressure reduction in the first train segment when communication between the first and second control subsystems is disrupted.

The second control subsystem may also command a brake pipe pressure reduction to the third control subsystem responsive to a reduction in brake pipe pressure in the second train segment and when communications between the first control subsystem and second control subsystem are disrupted. The present invention provides a back-up to the radio control system of the locomotives.

The third control subsystem preferably comprises a radio transceiver to communicate with a corresponding radio transceiver in the second control subsystem. In this embodiment, a wire cable need not be mated between the two train segments to allow the third and second control subsystems to communicate. The radio transceivers may be spread spectrum transceivers which operate at relatively low power, do not typically require a government license, but which are reliable and robust in the presence of noise.

The first control subsystem preferably defines a lead unit, and the second control subsystem preferably defines a remote unit under control of the lead unit. Of course, multiple remote units in multiple train segments can be controlled from the lead unit.

The third control subsystem preferably comprises a coupler for connecting to an end of the brake pipe of the first train segment. In addition, the at least one control valve comprises at least one pressure release valve, and may comprise redundant valves in some embodiments. Redundant pressure transducers may also be provided.

A method aspect of the invention is for operating a train of a type including a plurality of train segments. The method preferably includes the steps of: coupling an end of a first train segment to a front of a second train segment and leaving a brake pipe separated between the train segments; controlling train braking using communications between a first control subsystem at a locomotive of the first train segment and a second control subsystem at a locomotive of the second train segment; and using a third control subsystem at a railcar adjacent the end of the first train segment for communicating a signal related to brake pipe pressure adjacent the end of the first train segment to the second control subsystem, and for controlling brake pipe pressure adjacent the end of the first train segment responsive to a command from the second control subsystem. The second control subsystem and the third control subsystem prefer-ably cooperate so that the brake pipe pressure adjacent the end of the first train segment and a brake pipe pressure adjacent a front of the second train segment are substantially matching thereby emulating operation with a continuous brake pipe.

BRIEF DESCRIPTION OF THE DRAWINGS

FIG. 1A is a schematic diagram of trains being connected in tandem in accordance with the present invention.

FIG. 1B is a schematic diagram of the connected trains of FIG. 1A being configured for coordinated operation in accordance with the invention.

DETAILED DESCRIPTION OF THE PREFERRED EMBODIMENTS

Figure 2:
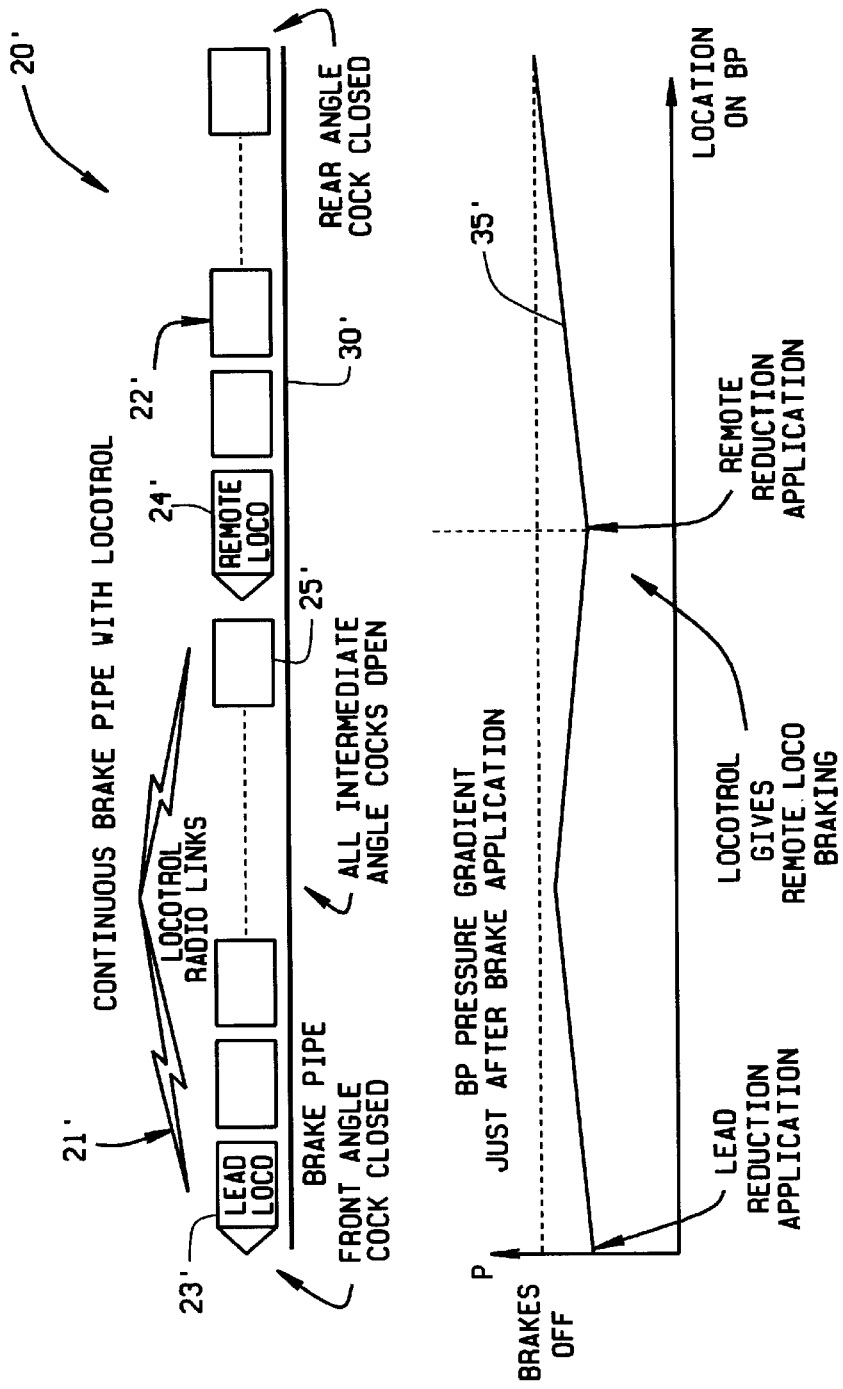
FIG. 2 is a schematic train diagram and brake pipe pressure plot for a train having coordinated control and a continuous brake pipe as in the prior art.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers and prime and double prime numbers refer to like elements throughout.

The basic LOCOTROL architecture where a lead locomotive controls up to 4 remote locomotives is well suited to the train coupling and sharing/train doubling concepts. Multiple LOCOTROL-equipped trains can be merged together to form a single train. Personnel savings are gained because the remote locomotives do not require crews. A train configured with a continuous brake pipe and multiple locomotives evenly distributed throughout the train benefits from multiple air venting and charging locations. This permits all cars within a long train to be operated in the "P" position since the brake pipe pressure gradients are small compared to a train with locomotives only located at the front. In these types of trains, the cars closest to the locomotives may have to operated in the "G" position to compensate for the time required to activate the brakes at the rear of the train.

Distributed power (DP) trains are well-suited to running longer and heavier trains that would not otherwise be possible due to hook tensile load limitations at the interface between the head end consist and the freight. In-train forces in DP trains are more evenly distributed and DP provides smoother braking and acceleration which further reduces these loads so that longer and heavier trains may be used. Coupling several trains together and operating them in the distributed power mode saves manpower since the remote locomotives are unmanned. The goal of providing rendezvous technology where trains may be coupled together while moving is not provided by the original LOCOTROL product. A significant philosophy change for the braking systems may help to realize this last goal; e.g., a segmented brake pipe (SBP) vs. the traditional continuous brake pipe (CBP). Conversely, the use of a SBP may detract from the natural advantage distributed power trains provide to meet the goal to operate long trains with all cars in the "P" position. The present invention addresses techniques for successfully employing a segmented brake pipe on distributed power-equipped trains and to address the resulting conflicts in operational performance. Besides a segmented brake pipe, an automatic coupler, and precision slow speed train control may also be helpful for connecting moving train segments.

Since the automatic air brake was invented in the 1800's, the railroad industry has designed their operations around a continuous brake pipe. It has proven to be safe, reliable and predictable. Any design using a SBP should at least match the safety and reliability of a system using a CBP. To match CBP performance, specific operational features of CBP should be emulated in the SBP approach. Additionally, the communication property of the CBP is used by the LOCOTROL control system for sensing normal braking conditions and emergency braking conditions in the train. This added pneumatic communications feature substantially contributes to proper train control as a primary and backup control method under various system stresses, especially when the train is in a communications blackout.

The operational need for a segmented brake pipe is a departure from present methods used to assemble trains at intermediate marshaling points within the railroad complex. Specifically, trains arriving at the marshaling point from diverse locations need to be assembled into larger consists, intact and with minimum crew involvement. This means that air hose connections must remain unperturbed, and coupling cars together requires no manual intervention by the yard crew or train crew. Once the train segments are joined, only the lead locomotive requires a crew. The crews from the remote locomotives are not required and may be reassigned for other duties.

As shown in FIG. 1A arriving trains are connected together in tandem so that each defines a train segment 21, 22 of the overall train 20. Each train arriving is already configured as a stand-alone train, and is equipped with LOCOTROL in the illustrated embodiment. The LOCOTROL system is an example of a control subsystem for controlling train braking and motive power as described above. The lead locomotive 23 includes a first control subsystem or LOCOTROL system, and the remote locomotive 24 includes the second control subsystem or LOCOTROL system. The LOCOTROL function is not initially engaged since the trains have only head end power. In this scenario, the trains are simply coupled. Brake hoses between the last wagon or railcar 25 of the first segment 21 remain unconnected to the rear segment 22, and air anglecocks at the joining of these segments remain closed as illustrated. LOCOTROL is engaged in the remote locomotive 24, then the lead locomotive LOCOTROL and the remote locomotive LOCOTROL system are linked or caused to work together as will be readily appreciated by those skilled in the art.

At this point, the crew from the second train segment may vacate the train 20 and a lead locomotive crew is in place and tends the entire train from the lead locomotive 23. The LOCOTROL equipment provides all of the needed throttle and brake actions in the remote locomotive 24, as executed by the train crew in the lead locomotive 23. At no time is a yard crew member or train crew member needed to physically tend to the joining of the trains at the marshaling location.

This scenario reflects the ideal sequence of running combined trains with minimum crew interaction. What will be explained as follows is the operation of the segmented brake pipe and how it will operate with the same reliability as a CBP, with no additional crew interaction at the mars haling point.

The notion of hands-off, tandem train coupling clearly depends upon a change from using the manually operated hook to an automatic system for wagon connection as will be readily appreciated by those skilled in the art. By eliminating the need to connect air hoses for the brake pipe at the coupling of the forward and rear segments, the operational strategy is supported by eliminating the yard crew effort to make the coupling. LOCOTROL provides the feature of controlling the remote locomotive from the head end locomotive. This feature is a significant step in eliminating the train crew from the second locomotive 24. There are a number of benefits, such as yard crew savings by not requiring hands-on attention when tandem trains 21, 22 couple to form longer combined trains 20. The automatic coupler and CBP emulation enable this benefit. Saving time in yards comes from the simple "couple and configure LOCOTROL" scenario, and performing usual brake terminal tests. By eliminating the work tasks of manual coupling and air hose connections, so is the time to do these also eliminated. Running a single, long train is less expensive that running two equivalent small trains. In addition, longer trains allow higher freight throughput densities for a given route.

Long trains can be run in the "P" position as is accommodated by distributing locomotives throughout the train. This provides multiple sources for air charging to release the brakes and air venting to apply the brakes. This feature evenly distributes the timing of brake applications and releases so that all wagons may be operated in the "P" position. Due to the physics of braking, there are limits for running a train in the "P" position regardless if it is a single continuous train or a segment in a DP train. In other words routes. Trains longer than 700 meters are facilitated with LOCOTROL remote locomotive control. For SBP trains, the combining of several 700 meter trains is created most simply by coupling trains and leaving brake pipes segmented.

Saving trained crew results principally with using LOCOTROL remote, unmanned locomotive control. Track wear is reduced through LOCOTROL, since remote locomotive control reduces maximum in-train forces and reduces peak friction losses on curves and grades.

SBP poses several concerns for effective operation. The basis of comparison for acceptable operation is the continuous brake pipe system. Table 1 describes three specific scenarios to be addressed.

TABLE 1

| Scenario | Performance Issue | CBP Mitigation | SBP Safety Considerations |
|---|---|---|---|
| RF Communication loss between lead and remote locomotives | Rear segment incapable of braking when RF communication is lost. A train stopped in RF comm loss area cannot release brakes. | CBP acts as a backup communication link. Air is used as the communication medium. The remote locomotives sense unexpected brake pipe pressure changes and react accordingly. | SBP needs backup communication path since the brake pipe is segmented. |
| Fracture in brake pipe. | Avoid derailments when fractures in the brake pipe occur. | Automatic air brake valves are designed to apply brakes throughout the entire train when the brake pipe pressure falls (as would occur with any fracture in a continuous brake pipe). | A brake pipe fracture in one segment is not automatically sensed by wagon air brake valves in other segments. If a communication loss exists, a derailment will occur. Derailments may occur even if RF communications are perfect due to the time required to sense the BP drop and radio a braking command to other train segments. |
| Train integrity verification | Positive verification and identification of train segments composing the entire train. Positive verification is required to ensure RF commands are being sent and received by the correct locomotives. | Continuous brake pipe provides method for verifying integrity and identification of all train segments. Brake pipe pressure changes made by the lead are sensed and reported by all remote units within the same train to the lead unit | Segmented brake pipe requires alternate method for verifying train integrity. | if a train exceeds a particular number of axles, the locomotive and a particular number of wagons behind the locomotive must be set to the "G" position to avoid high in-train forces. For a DP train with SBP, the quantity of wagons operated in the "G" position is expected to be slightly higher than ideal since each segment only gets the benefit of a single locomotive charging and venting air and the larger discontinuous pressure gradients present at the segmentation.

The invention will save energy/fuel by running longer trains with distributed power (DP). Reduced in-train forces (from DP) reduces rolling friction losses and results in fuel savings. Tests in Brazil and Australia show savings between 2 and 5% depending on the gradients and curvature of the One approach for mitigating the first scenario is to simply stop the train when an RF communication loss is detected. This approach is not recommended since, although not common, RF communication outages are not rare either. Radio communications outages result from several basic scenarios as will be readily appreciated by those skilled in the art. Stopping trains whenever RF communication losses occur would result in unpredictable scheduling of trains and would lower rail throughput efficiency. In addition, installation of numerous RF repeaters may be economically unrealistic. A more operationally reliable approach would be to develop a backup communications medium to relay braking commands during RF communication outages.

The second scenario where a fracture in a brake pipe occurs has the most serious potential ramifications In a system using a continuous brake pipe, fractures in the brake pipe are propagated in both directions from the fracture, setting car valves to apply brakes as the air pressure wave progresses. This naturally limits in-train forces to a smooth gradient. This system is failsafe. If a fracture occurs, the train is safely stopped by the failsafe design of the automatic air brake valves located in each wagon for the entire length of the train. In a system employing a simple segmented brake pipe, this failsafe feature is bypassed. If a fracture occurs, only the wagons in that segment are automatically stopped. The RF link between the locomotives at the head of each segment must be intact to transmit stop commands to the other train segments.

The third issue of verifying train configuration integrity can be mitigated by manual inspections, but this defeats one of the primary DB goals, since manpower is now required to verify train integrity. It is also subject to human error. The need to verify train integrity has been proven during 30 years of experience in operating DP trains. A continuous brake pipe is the basis for standard rail operations, and for a SBP an alternate approach is required to verify train integrity with the same high confidence as with a continuous brake pipe.

To address the criteria for a segmented brake pipe, we must first understand the benefits of the continuous brake pipe and the service features performed by a CBP. FIG. 2 illustrates the salient characteristics of CBP in a LOCOTROL control system equipped train as in the prior art. With CBP, air pressure may be vented or charged from either locomotive 23', 24' or both locomotives, and pressure will self-equalize along the brake pipe 30'. In SBP, closed anglecocks prevent the air from equalizing throughout the train for reductions/increases in the front segment or reductions/increases in the rear segment without some additional means for causing pressure to equalize between the segments.

The pressure gradient 35' along the brake pipe 30' during air pressure reductions as shown in the bottom portion of FIG. 2, typically results in small differential braking forces between wagons while the reduction is occurring, before pressure equalizes. Small differential braking forces do not cause excessive pulling forces along the train's physical connections. In the case where brakes are to be released, the pressure distribution is analogous. The in-train forces are evenly distributed with no sharp discontinuities.

Figure 3:
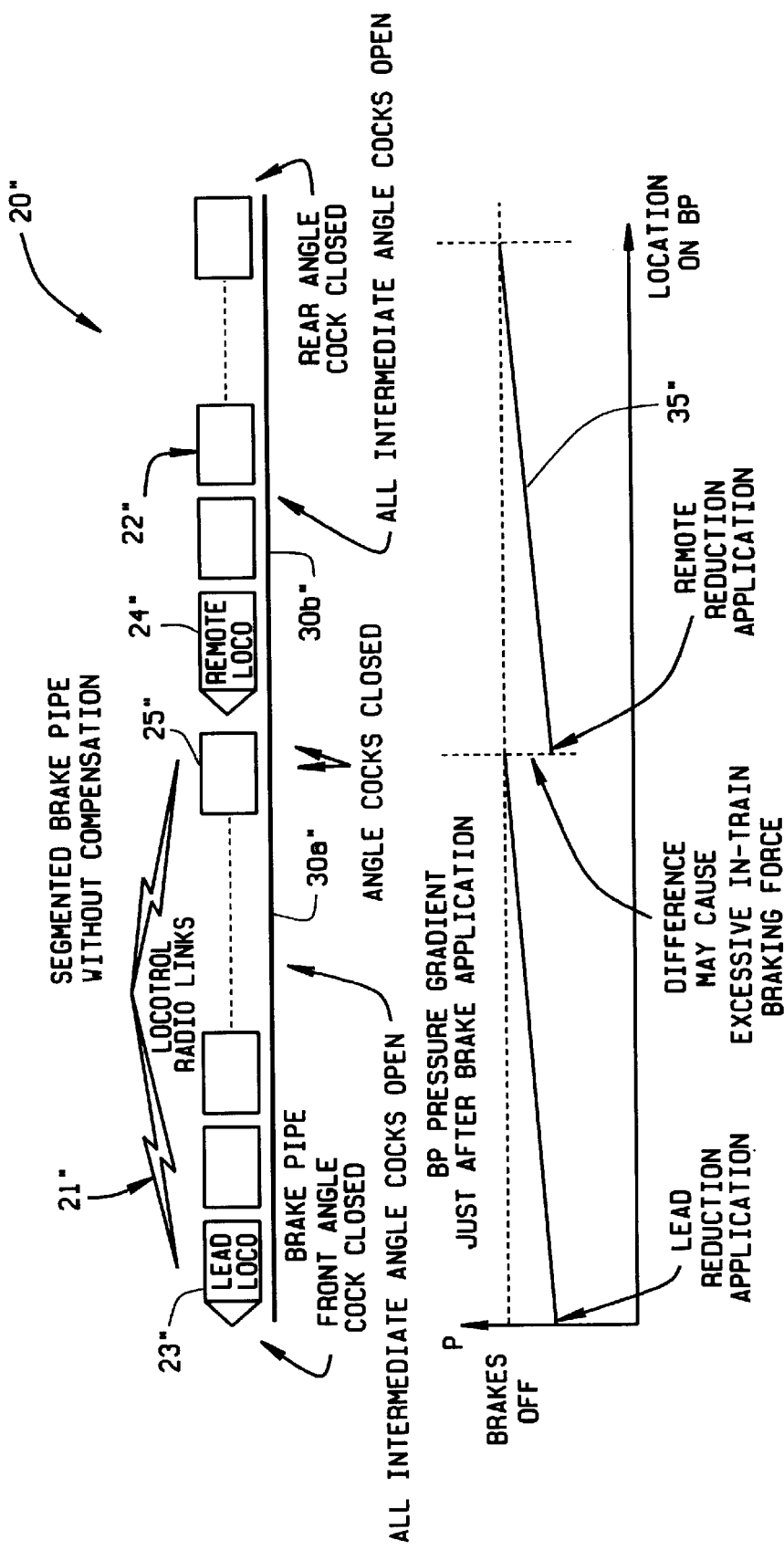
FIG. 3 is a schematic train diagram and brake pipe pressure plot for a train having a segmented brake pipe but illustrating a lack of compensation.

For a segmented brake pipe train 20" as illustrated in FIG. 3, brake pipe air reductions created by the lead and remote LOCOTROL-equipped locomotives 23", 24" cause a pressure difference to occur across the segment location. The amount of pressure difference and the duration of this difference is cause for concern. The pressure difference should not exceed safe values with regard to train braking forces. Excessive forces may occur in the coupling between the second locomotive 24" and the last wagon 25" in the front segment 21". A similar pressure gradient is created in a SBP train 20" when brakes are to be released as will be understood by those skilled in the art. The brakes are fully released quickly at the front of a segment while the brakes at the rear of the segment just ahead are still applied. These factors, of course, would be eliminated by a virtually continuous brake pipe approach as described in greater detail below.

Figure 4:
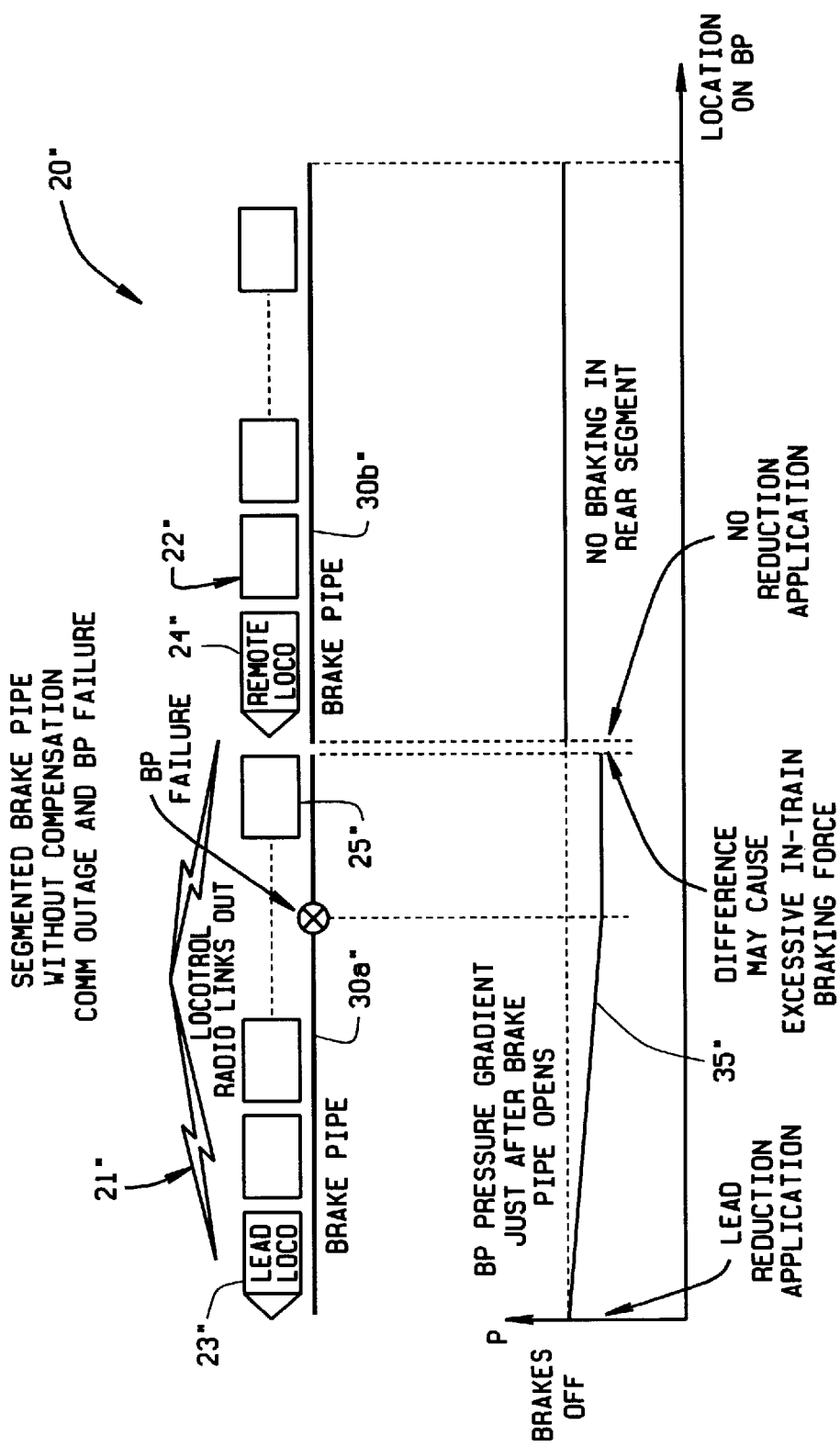
FIG. 4 is a schematic train diagram and brake pipe pressure plot for a train having a segmented brake pipe but illustrating a lack of compensation during a communication outage and with a brake pipe failure in the forward train segment.
Figure 5:
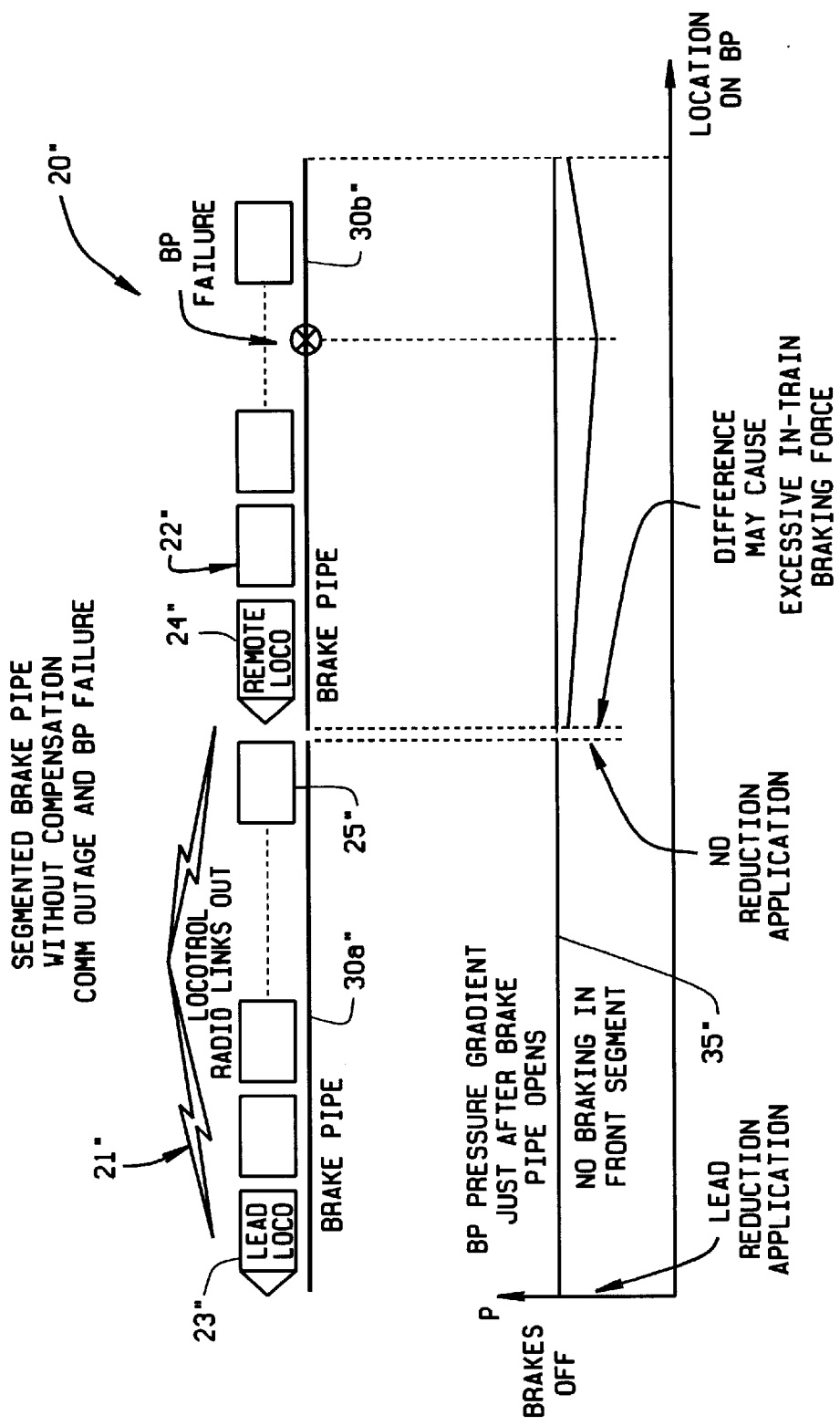
FIG. 5 is a schematic train diagram and brake pipe pressure plot for a train having a segmented brake pipe but illustrating a lack of compensation during a communication outage and with a brake pipe failure in the rear train segment.

Another condition of unbalanced braking occurs for the condition of brake pipe separation during a LOCOTROL system communication outage as illustrated in FIG. 4. The case where the front segment brake pipe 30a" opens leaves the rear segment 30b" with no braking. This causes excessive pushing forces against the last wagon 25" in front of the remote locomotive 24". The other case where a brake pipe failure occurs in the rear segment 22" is similar as illustrated in FIG. 5. When the rear segment brake pipe 30b" opens, no braking occurs in the front segment of the train 21". This leads to excessive pulling forces in the front segment.

Figure 6:
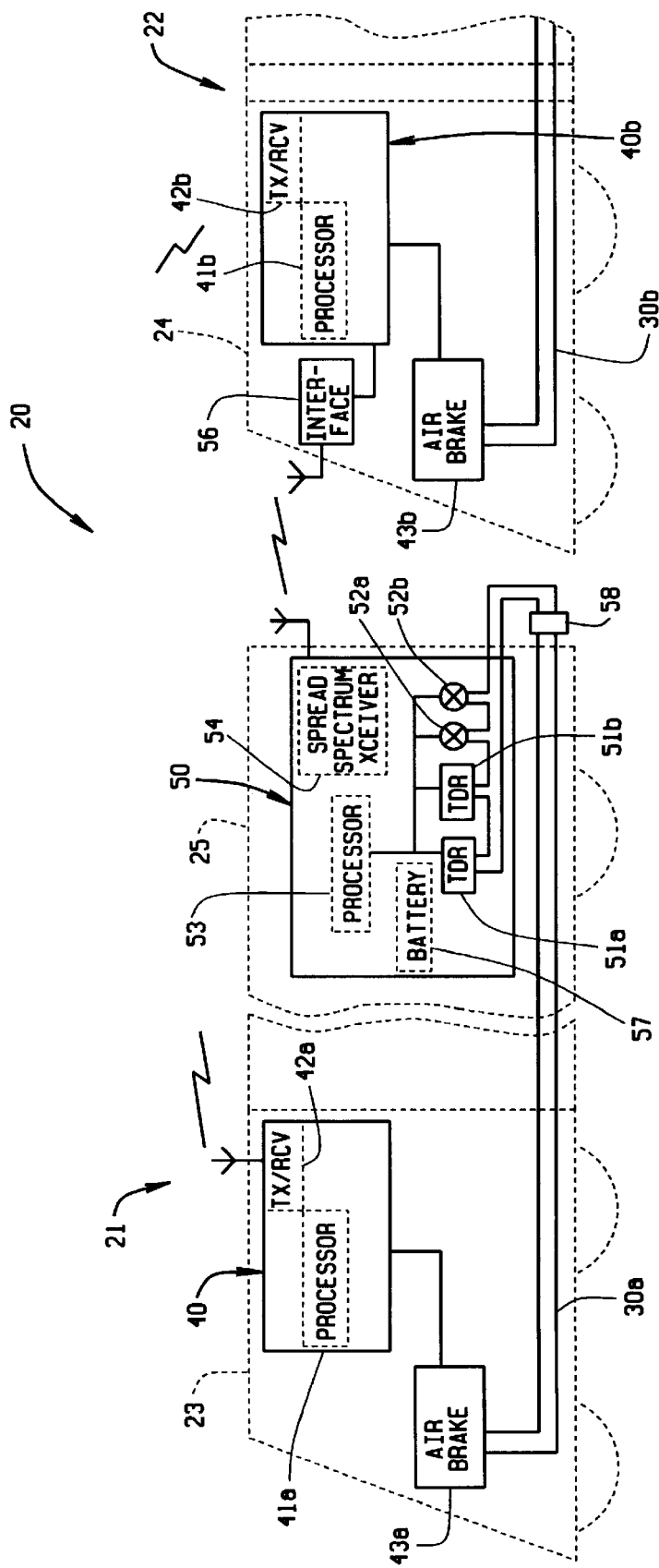
FIG. 6 is a schematic train diagram illustrating a control system in accordance with the present invention.

The present invention creates a virtual interface across the brake pipe segmentation that allows the brake pipe pressures on either side of the segmentation to remain near equal in value as understood first with reference to FIG. 6. This virtual interface can be realized as a partially compensated SBP which compensates for brake applications only or a fully compensated SBP which would additionally support brake releases.

The train control system is for a train 20 comprising at least first and second train segments 21, 22 including a brake pipe 30a, 30b being separated between adjacent train segments. The train control system preferably comprises a first control subsystem 40a for installation in the locomotive 23 of the first train segment 21 and a second control subsystem 40b for installation in the locomotive 24 of the second train segment 22. The first and second control subsystems communicate with one another for controlling train braking and/or motive power, such as using a LOCOTROL components as described above, and as will be readily understood by those skilled in the art. The first control subsystem 40a illustratively includes a processor 41a connected to a radio transceiver 42a. The first control subsystem 40a is also coupled to the pneumatic brake system 43a of the first locomotive 23. The components of the second control subsystem 40b are similar and require no further discussion.

The control system also illustratively includes a third control subsystem 50 installed in a railcar or wagon 25 adjacent an end of the first train segment 21. This third control subsystem 50 illustratively includes redundant pressure transducers 51a, 51b for sensing brake pipe pressure adjacent the end of the first train segment, and redundant magnetic control valves 52a, 52b for controlling brake pipe pressure adjacent the end of the first train segment. The third control subsystem 50 also illustratively includes a coupler 58 for connecting to an end of the brake pipe 30a of the first train segment 21, and a battery 57.

The third control subsystem 50 also includes a processor 53 for communicating a signal related to brake pipe pressure adjacent the end of the first train segment to the second control subsystem 42b, and for controlling brake pipe pressure adjacent the end of the first train segment responsive to a command from the second control subsystem. In the illustrated embodiment, the processor 53 is connected to a spread spectrum transceiver 54 which communicates with a corresponding spread spectrum transceiver in the interface 56 in the second locomotive 24 and operatively connected to the processor 41b of the second control subsystem 40b.

The second control subsystem 40b and the third control subsystem 50 preferably cooperate so that the brake pipe pressure adjacent the end of the first train segment 21 and a brake pipe pressure adjacent a front of the second train segment 22 are substantially matching thereby emulating operation with a continuous brake pipe. Accordingly, coordination of the braking between the first train segment 21 and the second train segment 22 is achieved, and the assembly and disassembly of train segments is enhanced by not requiring connection and later disconnection of the brake pipe between adjacent train segments.

According to one aspect of the invention, the second control subsystem 40b may command a brake pipe pressure reduction to the third control subsystem responsive to the first control subsystem 40a, such as for normal LOCOTROL operation. Efficiency and speed of braking is thereby enhanced while also avoiding potentially high forces between the first and second train segments.

According to another aspect of the invention, the third control subsystem 50 may communicate a signal relating to a brake pipe pressure reduction in the first train segment 21 to the second control subsystem 40b when communication between the first control subsystem 40a and second control subsystem 40b is disrupted. In one variation, the first and second control subsystems 40a, 40b further control motive power as in a LOCOTROL system. Thus, the second control subsystem 40b causes the second locomotive 24 to idle down responsive to the brake pipe pressure reduction in the first train segment 21 when communication between the first and second control subsystems is disrupted.

The second control subsystem 40b may also command a brake pipe pressure reduction to the third control subsystem 50 responsive to a reduction in brake pipe pressure in the second train segment 22 and when communications between the first control subsystem 40a and second control subsystem 40b are disrupted. In other words, the present invention provides a back-up to the radio control system of the locomotives.

The third control subsystem 50 preferably comprises a radio transceiver 54 to communicate with a corresponding radio transceiver in the interface 56 in the second control subsystem 40b. In this embodiment, a wire cable need not be mated between the two train segments 21, 22 to allow the third and second control subsystems to communicate. As noted above, the radio transceiver 54 in the third control subsystem 50 and the corresponding radio transceiver in the interface 56 of the second control subsystem 40b may be spread spectrum transceivers which operate at relatively low power, do not typically require a government license, but which are reliable and robust in the presence of noise.

The first control subsystem 40a preferably defines a lead unit, and the second control subsystem 40b preferably defines a remote unit under control of the lead unit as in a conventional LOCOTROL equipped train. Of course, multiple remote units in multiple train segments can be controlled from the lead unit. In addition, although only one third control subsystem is shown, multiple such units could be provided if more than two train segments needed to be connected together.

Figure 7:
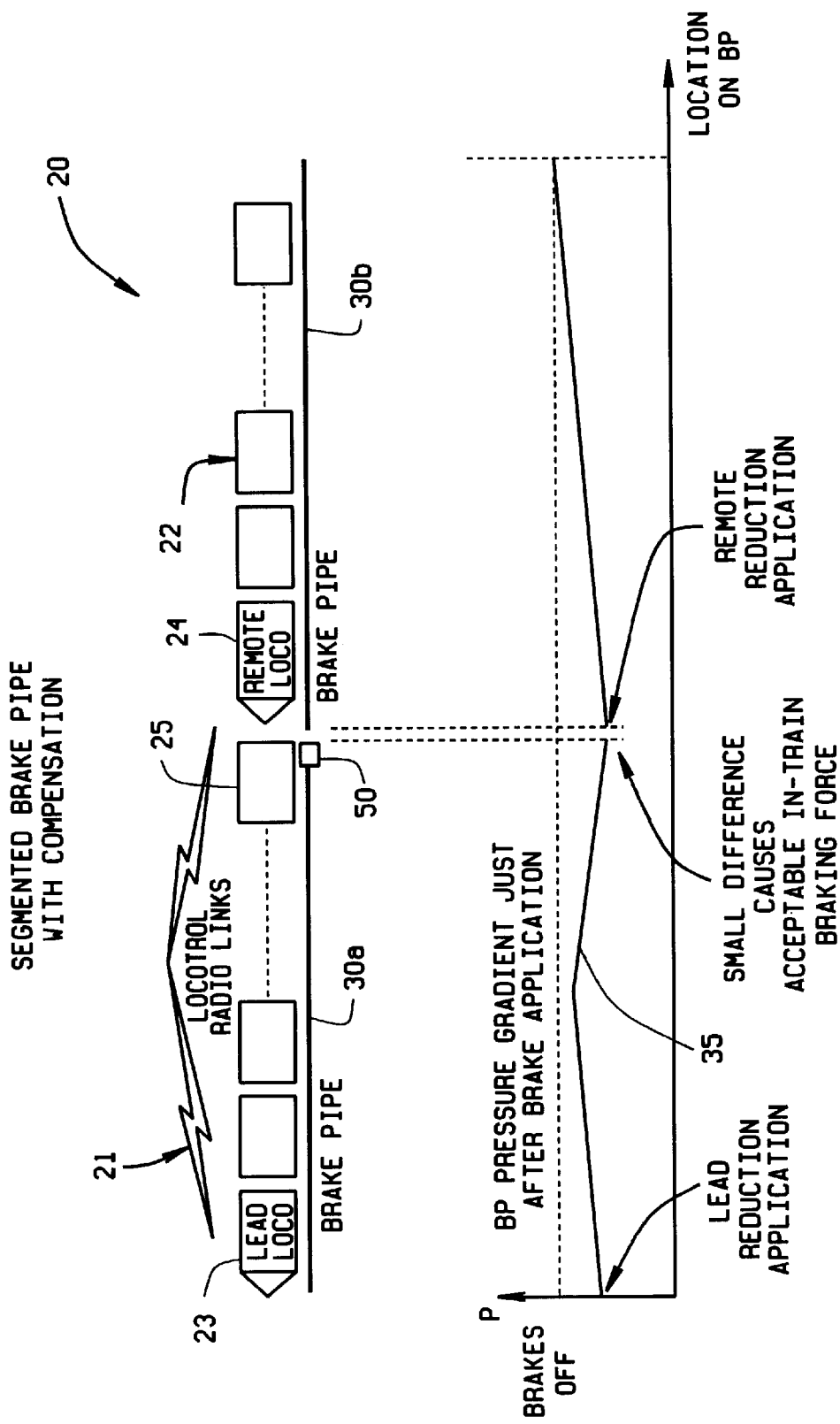
FIG. 7 is a schematic train diagram and brake pipe pressure plot for a train having a segmented brake pipe and compensation in accordance with the present invention.

What may be considered a partially compensated SBP function is illustrated in FIG. 7. The third control subsystem 50 (FIG. 6) creates pressure reductions on the wagon side of the brake pipe segmentation or first segment 21 in response to the pressure reductions in the rear segment 22. As the two locomotives 23, 24 reduce brake pipe pressure, the difference pressure across the segmentation is minimized. In this manner, the excessive difference braking forces at the segmentation are minimized.

What may be considered a fully compensated SBP system minimizes the excessive in-train forces also during brake releases at the segmentation interface. To do this, the third control subsystem requires an air source for charging the brake pipe. The charging source may be the main reservoir pipe which will then need to be coupled through each segment. This can be a significant impact since all wagons would have to be equipped with a second pipe (MR pipe). Accordingly, the fully compensated embodiment may not be practical in the near future and need not be discussed further at this time. In addition, it is postulated that the forces at the segments during brake releases may not be a significant concern because brake releases are made at the discretion of the driver, are typically made at lower speeds, and timing can be incorporated into the LOCOTROL command structure to delay brake releases at the remotes by a slight amount of time to ensure minimum in-train forces. Driver training will most probably be sufficient to overcome the need for compensation during brake release. This is not the case with brake applications which are sometimes made due to circumstances beyond the drivers control. The possible desirability of "running trains in the "P" position" depends on the manner of compensation. A fully compensated SBP allows the same maximum train length as expected with a CBP. With a partially compensated SBP the train length that could be run entirely in the "P" position will be smaller.

Figure 8:
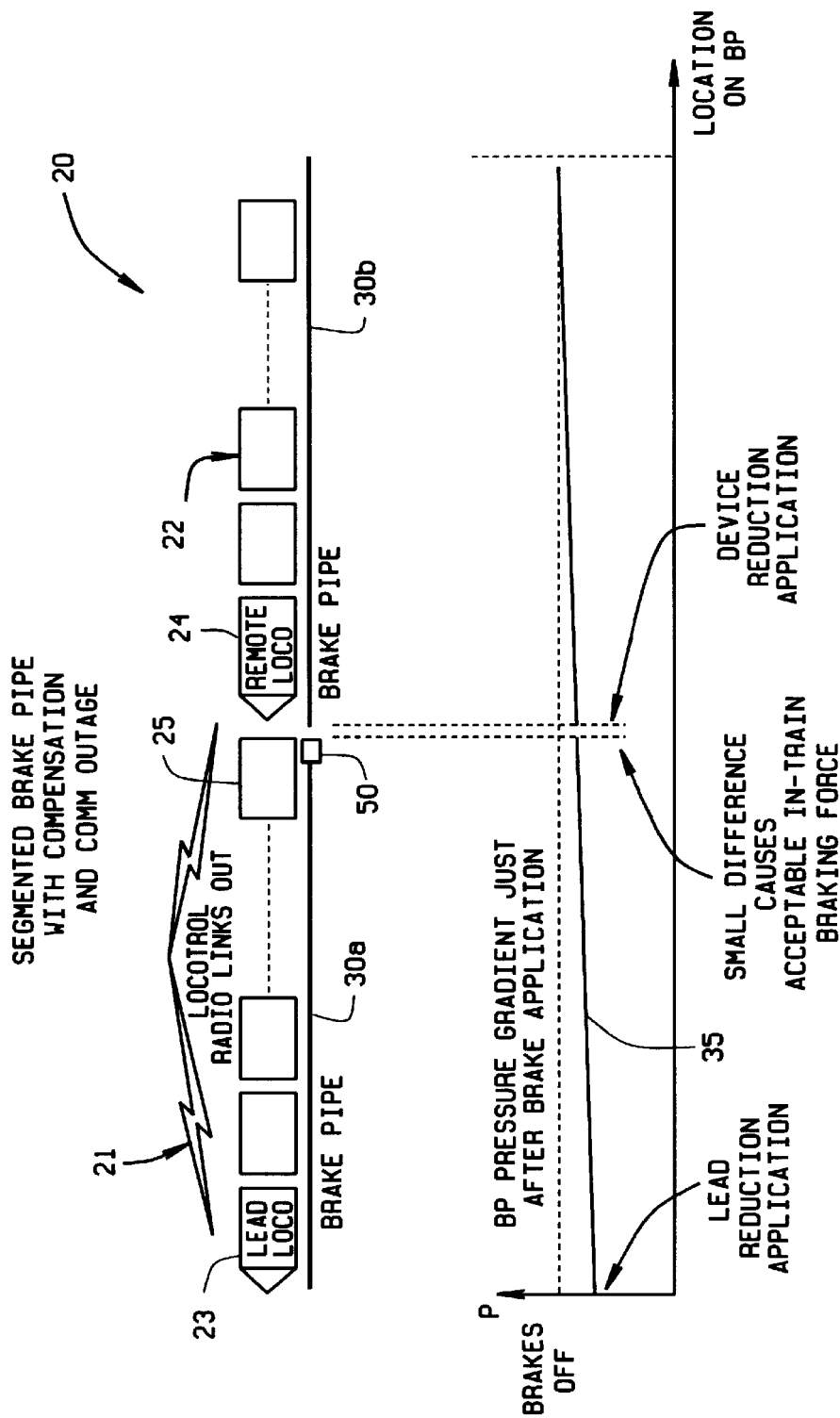
FIG. 8 is a schematic train diagram and brake pipe pressure plot for a train having a segmented brake pipe and compensation just after a brake application and during a communication outage in accordance with the present invention.
Figure 9:
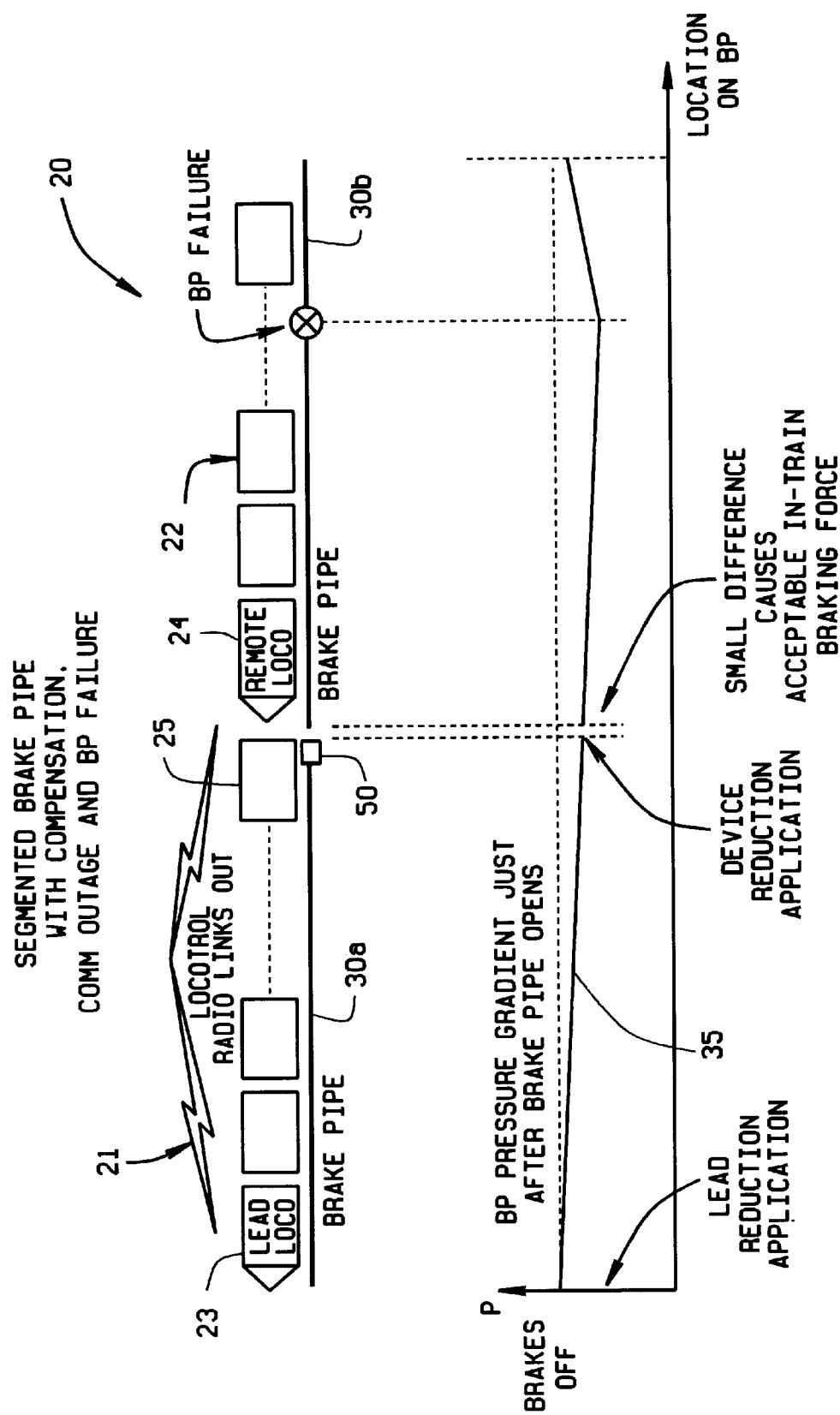
FIG. 9 is a schematic train diagram and brake pipe pressure plot for a train having a segmented brake pipe and compensation having a brake pipe failure in the rear segment and during a communication outage in accordance with the present invention.

For the train 20 including the third control subsystem 50 during communications outages, the third control subsystem is capable of communicating the forward segment brake pipe pressure to the rear segment (LOCOTROL control) to create matching rear segment brake pipe pressure reductions as illustrated in FIG. 8, for example. A brake pipe failure scenario in the second segment 22 with corresponding recovery is illustrated in FIG. 9 as will be readily appreciated by those skilled in the art. In this illustration, the rear segment brake pipe 30b opens, while LOCOTROL control is experiencing communications outage. The rear segment LOCOTROL or second control subsystem senses pressure reduction and communicates the pressure values to the third control subsystem 50. The third control subsystem 50 vents the front segment brake pipe 30a to the same value as the message instructs.

Figure 10:
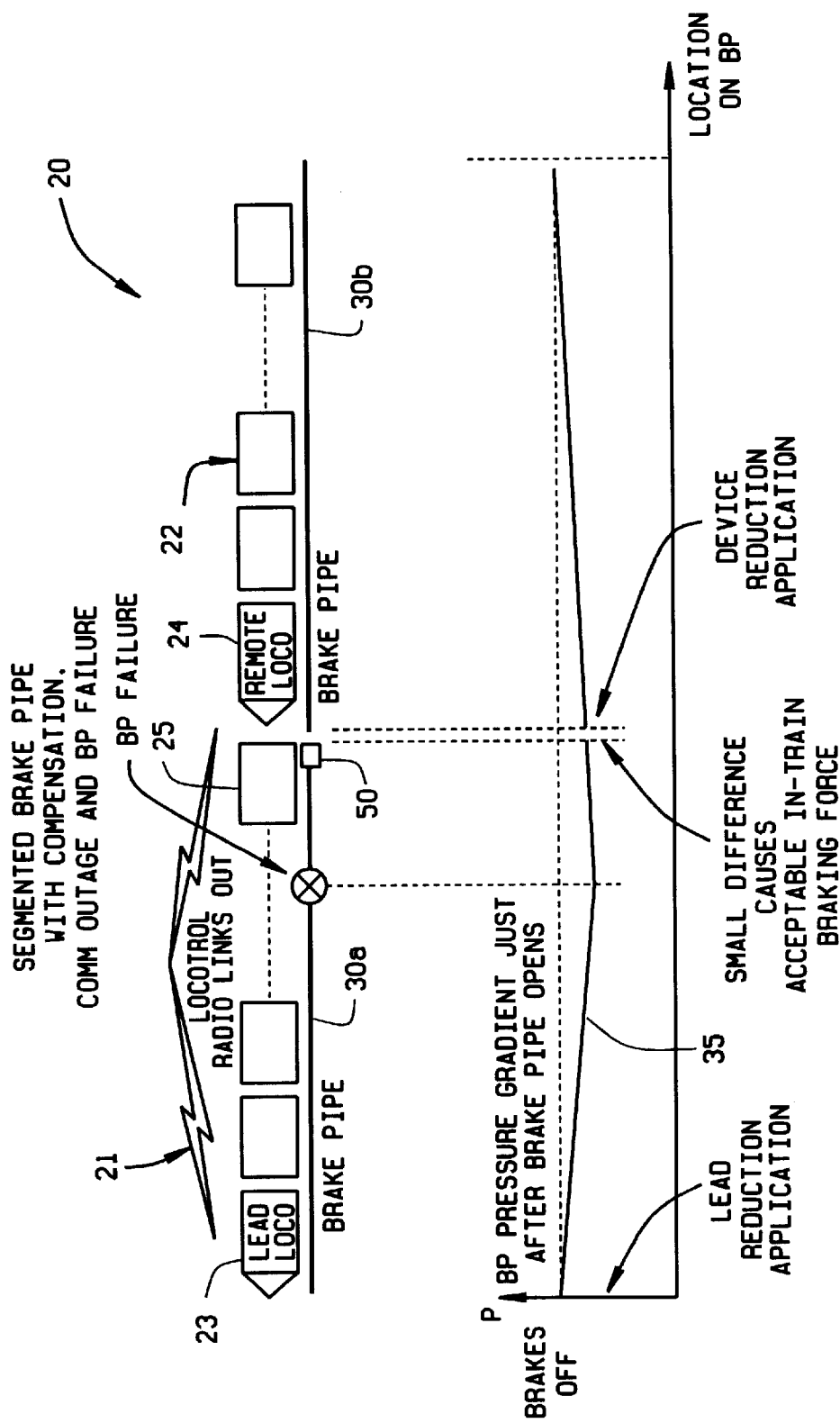
FIG. 10 is a schematic train diagram and brake pipe pressure plot for a train having a segmented brake pipe and compensation having a brake pipe failure in the forward segment and during a communication outage in accordance with the present invention.

A front segment brake pipe 30a failure scenario with corresponding recovery is presented in FIG. 10. In this illustration, the front segment brake pipe 30a opens while LOCOTROL control is experiencing communications outage. The third control subsystem 50 senses pressure reduction and communicates the pressure values to the second control subsystem in the second locomotive 24 in the rear segment 22. The second control subsystem vents the rear segment brake pipe 30b to the same value as the message instructs.

The concepts discussed above and relating to the third control subsystem 50 are based on several factors that relate to technology availability, performance reliability, design concepts maturity/experience and cost factors in design and production as set forth in TABLE 2 below.

TABLE 2

|  | Source Availability | Reliable Performance | Design Factors | Cost Factors |
| --- | --- | --- | --- | --- |
| Measuring Pressure | Several proven sources for | Proven train performance | Good design experience | Mature manufacturing |

TABLE 2-continued

|  | Source Availability | Reliable Performance | Design Factors | Cost Factors |
|---|---|---|---|---|
|  | existing products. | pressure transducer components exist. | with pressure transducers. | processes. |
| Electrically Operated Valve | Several proven sources for existing products. | Proven train performance mag-valve components exist. | Good design experience with mag-valves. | Mature manufacturing processes. |
| Controller Function | Several available controller chips. | Integrated circuit reliability proven. | Circuit design and software design are routine. | Design criteria predictable. |
| Power System | Many battery suppliers. | Proven batteries for stressful applications are available. | Good design experience with wireless systems. | Batteries are low-cost and cost-effective. |

In 1992, G E Harris and Knorr-Bremse developed a Segmented Brake Pipe LOCOTROL system for Canadian Pacific Railway. The segmentation of brake pipe sections was accomplished by a Segmentation Unit located on the locomotives. The system was designed to operate with the front section's brake pipe hoses connected to the Locomotives such that Brake Pipe pressures from the front sections were available at all times to the remote LOCOTROL systems. In 1994, G E Harris developed a prototype Air Brake Repeater Unit for the AAR. This device was a portable unit that mounted on the side of a wagon located toward the back of a conventional train. The purpose of this device was to repeat automatic and emergency air brake commands such that braking times could be improved. The unit was controlled from the lead locomotive via a radio link. G E Harris is completing development of a wagon braking system that utilizes a radio link with each wagon's brake equipment to control wagon brakes throughout the train. The lead locomotive will initiate a brake command to the intra-train communication system, which relays the command throughout the train over the radio link. This concept allows simultaneous braking of all wagons within the train.

The approach in accordance with the invention does have minor disadvantages. For example, the battery requires recharging on a regular basis. Since the operational concept is to store the third control subsystem aboard a locomotive equipped with LOCOTROL, the battery charger may be designed into the LOCOTROL electronics. Another minor disadvantage is the desirability of installation of the third control subsystem on the last wagon of a segment whenever a LOCOTROL train is planned for operation. This is a negligible task when the effort of manually building a train segment with hooks and buffers is considered. When the automatic coupler is developed and deployed on a wide scale, there will be no need to manually build trains and the installation of the third control subsystem will become a larger disadvantage.

The following sections describe LOCOTROL operations with a partially compensated segmented brake pipe as described above.

Brake Valve CUT-IN: With a Continuous Brake Pipe when it is desired to cut in the Remote Feed Valve, the driver makes an automatic brake release. When the remote BP pressure rises 0.28 Bar, then the Remote Feed Valve comes in. With a Segmented Brake Pipe, the sequence is the same, except that the BP pressure is sensed by the pressure transducer at the end of the front section instead of the LOCOTROL BP transducer.

Brake Pipe Continuity Test: With a continuous brake pipe, the brake pipe test utilizes an automatic brake application at the lead to initiate the test. The remote must then detect this application by sensing an increase in air flow into the brake pipe. If the air flow is detected within 30 seconds of the application then the BP test passes. With a Segmented Brake Pipe, the test is basically the same up to the step where an automatic brake release is made at the lead to initiate the test. The remote will now monitor the BP pressure at the end of the front section of wagons, and when it rises 0.28 Bar within 30 seconds of the release, then the test passes.

Leakage Test: The leakage test is the same for Continuous and Segmented Brake Pipe systems. With the Continuous BP system, only the lead leakage is recorded, since the brake pipe is continuous. With the Segmented BP system, the leakage at each remote (or train section) is recorded.

Automatic Brake Applications: These are the same for Continuous and Segmented Brake Pipe systems. The segmented system will only allow the remote to apply brakes to the section behind it. There will not be a propagation of the automatic brakes from the remote to the lead due to the segmented brake pipe. An embodiment could include this feature using radio communications between the third control subsystem and the remote behind it. In order to ensure proper operation of this approach, the relationship of radio command response time versus brake pipe air propagation speed can be evaluated during brake rack testing. The time for a remote to respond to a lead radio command to apply or release brakes is typically less than 500 ms. This includes the time for LOCOTROL to detect the command resulting from a driver action, send a radio command to the remote, and for the remote to implement the command. Air propagation time for a UIC brake system is 280 meters per second. In a 350 meter train, a service brake application will take 1.25 seconds to reach the last wagon. The remote locomotive will already have its brakes applied for 0.75 seconds when the last wagon in the segment ahead of the remote has its brakes applied. This force may be adjusted by employing small delays in the responsiveness of remote locomotive reaction to lead commands for service rate applications.

Emergency Applications (Driver Initiated): When the Driver makes an emergency application at the lead unit, this application is relayed to the remote, where it also applies the emergency brakes to the rear section of the train. The remote also activates the valve in the third control subsystem, which applies the emergency brakes to last wagon of the front section of the train. The emergency brakes are now being applied on the train, from the lead to the remote, from the remote to the lead, and from the remote to the rear of the train. This action is similar to that with a continuous brake pipe.

Train Separation (Between Lead and Remote): If the separation is sensed by the lead unit first, then an emergency command will be relayed to the remote where the remote will react the same as a driver-initiated emergency. If the separation is sensed by the transducer at the remote first, then the remote will activate the emergency valves at the remote and the third control subsystem to propagate the emergency to the rear of the train. The remote will also relay the emergency to the lead unit where the emergency brakes will be applied.

Train Separation (Behind the Remote): When the separation is sensed at the remote, it will activate the remote emergency valve and the release valve in the third control subsystem, which applies the emergency brakes to the last wagon of the front section of the train. The remote also relays the emergency to the lead unit, where the emergency brakes are applied.

Communication Interruptions: In a continuous brake pipe system, when communications are lost, the remotes continue in the same traction/dynamic brake state and air brake state that they were last in. If the driver makes an automatic brake application at the lead, the remote will sense this application as increased air flow into the brake pipe and idle the locomotive and cut out the feed valve. The application will then propagate to the rear of the train. In the segmented brake pipe system, similar action is taken. The remote will continue in the same traction/dynamic brake state and air brake state that they were in. If the driver makes an automatic brake application at the lead unit, then the remote will sense the drop in the BP pressure via the third control subsystem and idle the remote locomotives down. It will also make an automatic brake application to match the BP pressure in the front section of the train. The entire train will then have the same braking effort.

Figure 11:
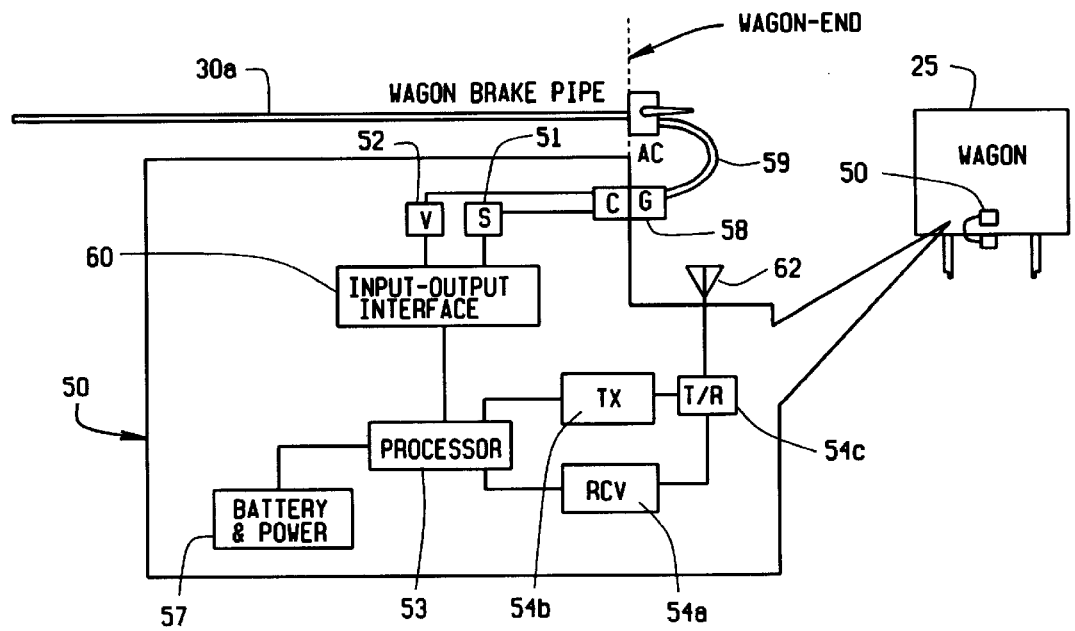
FIG. 11 is a schematic diagram of an embodiment of the third control subsystem in accordance with the present invention.

A variation of the third control subsystem 50 to be positioned on the last wagon 25 of a train segment is shown in FIG. 11. The control subsystem 50 is man-portable and attaches to the end of the last wagon in a train without any added accommodation on the wagon to retain the device. This is important so as not to require the entire fleet of wagons to be modified. Also, the attachment of the third control subsystem desirably does not affect the normal coupling of the wagon to another wagon or a locomotive. This holds true for the automatic couplers, as well as the hook-type coupler. The brake pipe interface is accommodated by connecting the wagon-end air hose 59 to the device instead of storing the hose-end on the retention bracket. Contained within an overall housing are the components shown in FIG. 11.

Brake pipe pressure sensing is provided by the pressure transducer 51 that gives an electrical signal proportional to gauge air pressure. Pressure readings are coupled to the processor 53 via the schematically illustrated input/output interface function 60. Using the sensed pressure values, the processor 53 formats a message containing a suitable message exchange transport protocol, builds a data packet (including train ID and device ID addresses), and sends the formatted message to the transmitter 54b. The transmitter 54b, using an appropriate link-access protocol, radio frequency and modulation format, exchanges the message (T/R switch 54c set to "T") with the external recipient. The external recipient, of course, is the interface device of the second control subsystem 40b on the second locomotive as explained in greater detail below. The antenna 62 is shared for transmitting messages and receiving messages.

Setting the antenna 62 and receiver 54a to receive messages in the appropriate sequence is defined within the link access protocol. The external sending function, mounted on the locomotive just across the segment, provides messages using an appropriate link-access protocol, and frequency and modulation format. Received messages are processed by the receive radio and processed messages are forwarded to the processor 53. The processor 53 creates control commands that are used to operate the magnet valve 52 to reduce pressure in the brake pipe 30a to match the air pressure value contained in the received message. The desired pressure value is sensed by the pressure transducer and sent to the processor 53 for closed loop control.

Figure 12:
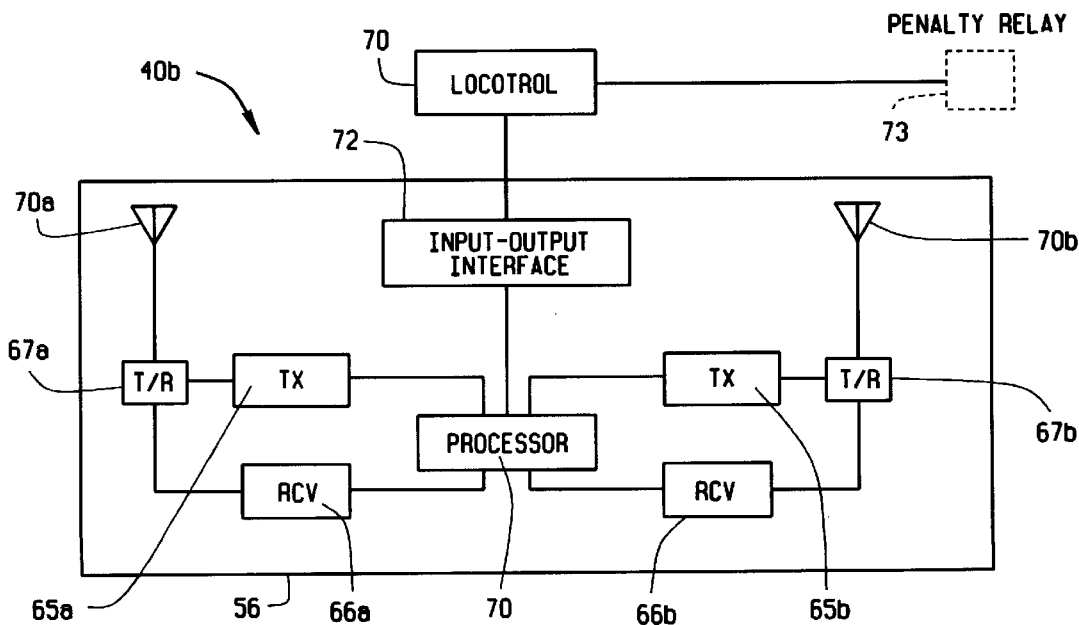
FIG. 12 is a schematic diagram of an interface for the following locomotive in accordance with the present invention.

Transmission protocol for the radio link may be half-duplex; sending or receiving alternately. Turning now additionally to FIG. 12, aspects of the second control subsystem are now described in greater detail. The locomotive antennas 70a, 70b that will communicate with the third control subsystem 50 will be mounted on each end of the locomotive, such as below the drivers windshield, and approximately in the same area where UIC connectors are located. The antennas 70a, 70b for the locomotive and the antenna 62 for third control subsystem may be simple patch antennas similar to the type employed for GPS satellite reception as will be readily appreciated by those skilled in the art. The interface 56 illustratively includes redundant transmitters 65a, 65b and redundant receivers 66a, 66b connected to respective antennas via T/R switches 67a, 67b. The interface 56 also illustratively includes a processor 70 connected to the LOCOTROL device 70 via the illustrated input/output interface 72. The LOCOTROL device 70, in turn, is connected to the schematically illustrated penalty brake relay 73 as will be readily understood by those skilled in the art.

A summary list of possible specifications for the third control subsystem 50 are provided in Table 3 below. This device is based on the capabilities of existing End of Train (EOT) devices currently used in North America. The major difference is the RF characteristics, since most conventional EOT devices currently in use employ UHF frequency allocations.

TABLE 3

| Parameter | Specification | Comments |
|---|---|---|
| Weight | 15 kg | Single person lift and carry |
| Size | 50 cm high, 25 cm wide, 15 cm deep | Carrying handle |
| RF Frequency | 2.4 GHz | |

TABLE 3-continued

| Parameter | Specification | Comments |
|---|---|---|
| RF Power | 200 mwatts | Requires no regulatory approval |
| Modulation | Direct sequence, spread spectrum | Interference resistant |
| Battery Capacity | 18 hours | NiCad rechargeable batteries |
| Wagon Mounting | Quick connect clamp on buffer | |
| Antenna Type | Patch antenna, 8 cm diam., 2 cm thick | Similar to GPS antenna used for military aircraft |

The concept for operating with the third control subsystem 50 and SBP takes advantage of efficiently using crew members so that extra tasks may be avoided at the marshaling location when trains are combined into longer trains without need for yard crews. To achieve this savings, the third control subsystem 50 is placed on the train at the time of originating train assembly, before the train arrives at the destination marshaling yard. In this way, the extra task of attaching the device is small compared to the other necessary manual tasks of assembling trains, including connecting the air hoses at each of the wagon junctions.

Figure 13:
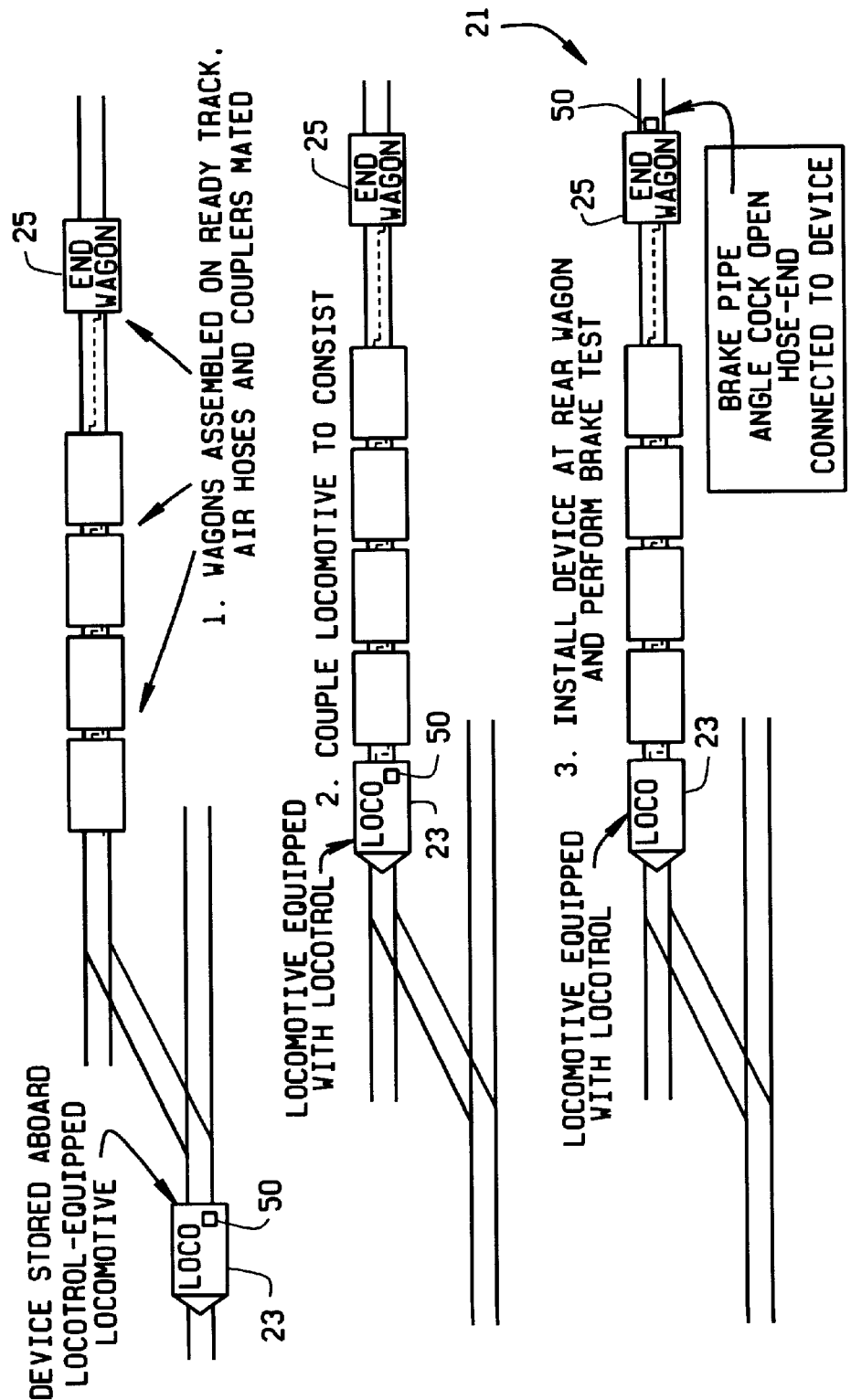
FIG. 13 is a schematic diagram illustrating a first series of steps for assembling train segments in accordance with the present invention.

In the example scenario shown in FIG. 13, a first train segment 21 being formed is illustrated along with the crew having to connect air hoses. For the case of hook couplers, the crew must also connect the hooks between wagons. When the sequence arrives at the coupling of the locomotive 23 to the assembled wagons, the same crew connecting the locomotive air hose can also perform the third control subsystem 50 (or device 50 for convenience) removal from the locomotive and attachment on the rear wagon 25. This plan requires the device 50 to be stored on the locomotive 23 when not attached to the rear wagon 25. The device 50 is normally assigned to a LOCOTROL locomotive. Included with device 50 attachment step is the connection of the end wagon air hose to the device to provide pneumatic access to the brake pipe 30a for pressure sensing and air venting.

Figure 14:
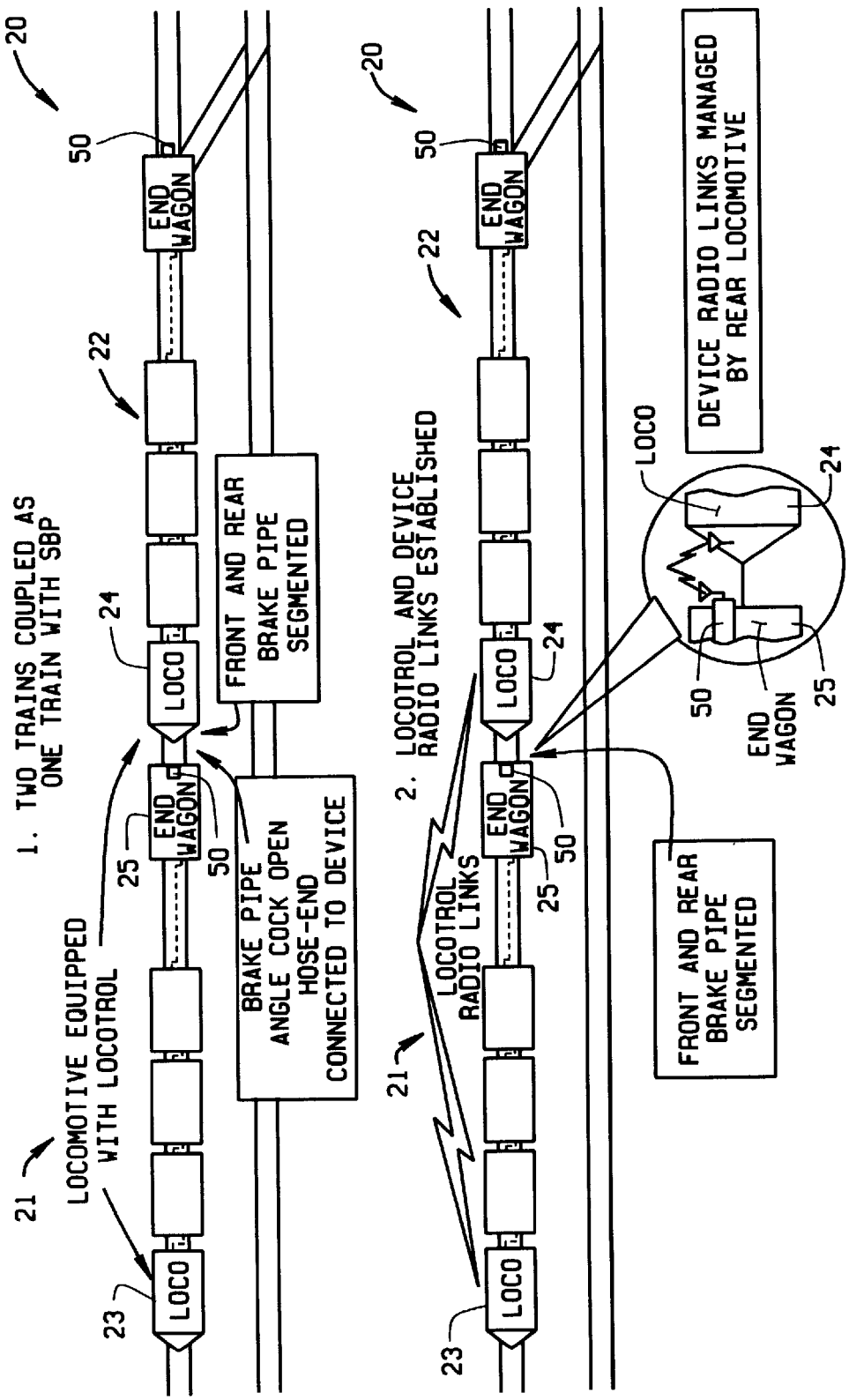
FIG. 14 is a schematic diagram illustrating a second series of steps for assembling train segments in accordance with the present invention.

The device 50 does not typically play any role while attached to the rear wagon without a following DP locomotive. The single, head-end locomotive-powered train operates as though no device 50 were in place. Upon completing the run to the marshaling location, the arriving trains are ready for assembly into longer trains. In the example of FIG. 14, two trains are joined as first and second train segments 21, 22 using the concepts established for hands-free setup of the device at the segment location in the combined train as described herein. After mechanically coupling the train, the lead and remote locomotives 23, 24 are LOCOTROL linked via radio. This establishes the operational protocol between the head end locomotive and the remote locomotive. This linking process is extended to accommodate the third control subsystem 50 functionality.

The lead locomotive 23 has a logical association with the device 50 on the end of the front train segment 21. The device 50 and lead unit LOCOTROL are associated with corresponding identification subaddresses. The intention is that the device 50 and its locomotive are "permanently," physically and logically associated. This property allows the verification of correct linking between the lead locomotive 23, the remote locomotive 24 and the associated device 50. In other words, the correct device 50 is identified in the linking and managing protocol. The radio links between the device 50 and the remote locomotive 24 are maintained by the remote locomotive LOCOTROL unit. The "signature information" for the correct device 50 for the particular train is maintained by the head end LOCOTROL for that segment. This concept may be extended for trains with multiple remotes.

As the train executes its run, the device 50 communicates brake pipe pressure information to the rear segment LOCOTROL unit 40b. Pressure changes in the forward segment 21 are transmitted (as messages) to the rear segment 22 and are emulated in the rear segment brake pipe 30b. Conversely, pressure reductions in the rear segment 22 are communicated to the front segment 21 via messaging through the device 50 from the rear segment LOCOTROL 40b and are emulated in the front segment brake pipe 30a.

After pressure reductions, the release of brakes (pressure restoration) is effected by the lead locomotive unit; i.e., raising the brake pipe pressure at the head end will be repeated in the rear segment 22 via the device 50 and the rear segment LOCOTROL 40b. At the completion of the combined train run and after the train is dismantled, the device 50 is returned to the associated locomotive 23. This holds true for all such devices 50 being returned to the appropriate locomotive. The "home" locomotive may be used for battery restoration (if secondary batteries are employed) and other maintaining factors, as may be necessary.

The radio link between the third control subsystem 50 on the last wagon 25 and the second control subsystem 40b on the second locomotive 24 is a relatively short distance (several meters), spanning from the wagon-end to the near-end of the locomotive. The locomotive 24 may be facing in either direction; hence, antennas are preferably located on both locomotive ends. To reduce the incidence of external interference, the antenna may use a shaped pattern, illuminating the path directly to the opposing antenna and minimizing stray energy directed to the side of the link. The same antenna pattern benefits the receiver by favoring the energy emitted by the opposite antenna and de-emphasizing the energy coming from stray sources to the side of the train. It may be desirable to use the unlicensed radio spectrum intended for low-power, wireless communications services. This RF spectrum, using direct spreading modulation techniques, is convenient for short, quick message transmission formats. This provides good robustness against interference and reflective (multipath) effects. Unlicensed spectrum operation also avoids the complexity of securing spectrum approval and licensing.

In other embodiments of the invention a multiconductor cable, for example, can be connected between the third control subsystem and the second control subsystem. For example, mating connector portions could be part of the physical automatic coupler. In addition, if electrical power is supplied from the second locomotive via the cable to the third control subsystem then the third control subsystem could be reduced in size as no battery would be needed.

A method aspect of the invention is for operating a train. The method preferably includes the steps of: coupling an end of a first train segment to a front of a second train segment and leaving a brake pipe separated between the train segments; controlling train braking using communications between a first control subsystem at a locomotive of the first train segment and a second control subsystem at a locomotive of the second train segment; and using a third control subsystem at a railcar adjacent the end of the first train segment for communicating a signal related to brake pipe pressure adjacent the end of the first train segment to the second control subsystem, and for controlling brake pipe pressure adjacent the end of the first train segment responsive to a command from the second control subsystem. The second control subsystem and the third control subsystem preferably cooperate so that the brake pipe pressure adjacent the end of the first train segment and a brake pipe pressure adjacent a front of the second train segment are substantially matching thereby emulating operation with a continuous brake pipe.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A train control system for a train comprising at least first and second train segments including a brake pipe being separated between adjacent train segments, the train control system comprising:
a first control subsystem for installation in a locomotive of the first train segment and a second control subsystem for installation in a locomotive of the second train segment, the first and second control subsystems communicating with one another for controlling train braking; and
a third control subsystem for installation in a railcar adjacent an end of the first train segment and comprising
at least one pressure transducer for sensing brake pipe pressure adjacent the end of the first train segment,
at least one control valve for controlling brake pipe pressure adjacent the end of the first train segment, and
a processor for communicating a signal related to brake pipe pressure adjacent the end of the first train segment to the second control subsystem, and for controlling brake pipe pressure adjacent the end of the first train segment responsive to a command from the second control subsystem.

2. A train control system according to claim 1 wherein said second control subsystem and said third control subsystem cooperate so that the brake pipe pressure adjacent the end of the first train segment and a brake pipe pressure adjacent a front of the second train segment are substantially matching thereby emulating operation with a continuous brake pipe.

3. A train control system according to claim 1 wherein said second control subsystem commands a brake pipe pressure reduction to the third control subsystem responsive to the first control subsystem.

4. A train control system according to claim 1 wherein said third control subsystem communicates a signal relating to a brake pipe pressure reduction in the first train segment to said second control subsystem when communication between the first control subsystem and second control subsystem is disrupted.

5. A train control system according to claim 4 wherein said first and second control subsystems further control motive power; and wherein said second control subsystem causes the second locomotive to idle responsive to the brake pipe pressure reduction in the first train segment when communication between the first and second control subsystems is disrupted.

6. A train control system according to claim 1 wherein said second control subsystem commands a brake pipe pressure reduction to the third control subsystem responsive to a reduction in brake pipe pressure in the second train segment and when communications between the first control subsystem and second control subsystem are disrupted.

7. A train control system according to claim 1 wherein said third control subsystem further comprises a radio transceiver; and wherein said second control subsystem further comprises a radio transceiver for communicating with the radio transceiver of said third control subsystem.

8. A train control system according to claim 7 wherein said radio transceiver of said third control subsystem comprises a spread spectrum transceiver; and wherein said radio transceiver of said second control subsystem.

9. A train control system according to claim 1 wherein said first control subsystem defines a lead unit, and said second control subsystem defines a remote unit.

10. A train control system according to claim 1 wherein said third control subsystem comprises a coupler for connecting to an end of the brake pipe of the first train segment.

11. A train control system according to claim 1 wherein said at least one control valve comprises at least one pressure release valve.

12. A train control system according to claim 1 wherein each of said first and second control subsystems comprises at least one radio transceiver.

13. A train control system according to claim 1 wherein each of said first and second control subsystems is for controlling power of the respective locomotive.

14. A train control system for a train comprising at least first and second train segments including a brake pipe being separated between adjacent train segments, the train control system comprising:
a first control subsystem for installation in a locomotive of the first train segment and a second locomotive control subsystem for installation in a locomotive of the second train segment, the first and second control subsystems communicating with one another via radio communication for controlling train braking; and
a third control subsystem for installation in a railcar adjacent an end of the first train segment and comprising
at least one pressure transducer for sensing brake pipe pressure adjacent the end of the first train segment,
at least one control valve for controlling brake pipe pressure adjacent the end of the first train segment, and
a processor and associated radio transceiver for communicating a signal related to brake pipe pressure adjacent the end of the first train segment to the second control subsystem, and for controlling brake pipe pressure adjacent the end of the first train segment responsive to a command from the second control subsystem so that the brake pipe pressure adjacent the end of the first train segment and a brake pipe pressure adjacent a front of the second train segment are substantially matching thereby emulating operation with a continuous brake pipe.

15. A train control system according to claim 14 wherein said second control subsystem commands a brake pipe pressure reduction to the third control subsystem responsive to the first control subsystem.

16. A train control system according to claim 14 wherein said third control subsystem communicates a signal relating to a brake pipe pressure reduction in the first train segment to said second control subsystem when communication between the first control subsystem and second control subsystem is disrupted.

17. A train control system according to claim 16 wherein said first and second control subsystems further control motive power; and wherein said second control subsystem causes the second locomotive to idle responsive to the brake pipe pressure reduction in the first train segment when communication between the first and second control subsystems is disrupted.

18. A train control system according to claim 14 wherein said second control subsystem commands a brake pipe pressure reduction to the third control subsystem responsive to a reduction in brake pipe pressure in the second train segment and when communications between the first control subsystem and second control subsystem are disrupted.

19. A train control system according to claim 14 wherein said radio transceiver of said third control subsystem comprises a spread spectrum transceiver; and wherein said second control subsystem comprises a spread spectrum radio transceiver.

20. A train control system according to claim 14 wherein said first control subsystem defines a lead unit, and said second control subsystem defines a remote unit.

21. A train control system according to claim 14 wherein said at least one control valve comprises at least one pressure release valve.

22. A train control system according to claim 14 wherein each of said first and second control subsystems is for controlling power of the respective locomotive.

23. A control subsystem for connection to a brake pipe at a railcar adjacent an end of a first train segment, the railcar being coupled to a locomotive of a second train segment and the brake pipe being separated between the first and second train segments, the control subsystem comprising:

at least one pressure transducer for sensing brake pipe pressure adjacent the end of the first train segment;

at least one control valve for controlling brake pipe pressure adjacent the end of the first train segment; and a processor and associated spread spectrum radio transceiver for communicating a signal related to brake pipe pressure adjacent the end of the first train segment to a control subsystem at the locomotive of the second train segment, and for controlling brake pipe pressure adjacent the end of the first train segment responsive to a command from the control subsystem at the locomotive of the second train segment.

24. A control subsystem according to claim 23 wherein the processor cooperates with the control subsystem at the locomotive of the second train segment so that the brake pipe pressure adjacent the end of the first train segment and a brake pipe pressure adjacent a front of the second train segment are substantially matching thereby emulating operation with a continuous brake pipe.

25. A control subsystem according to claim 23 wherein said third control subsystem comprises a coupler for connecting to an end of the brake pipe of the first train segment.

26. A control subsystem according to claim 23 wherein said at least one control valve comprises at least one pressure release valve.

27. A method for operating a train comprising the steps of:

coupling an end of a first train segment to a front of a second train segment and leaving a brake pipe separated between the train segments;

controlling train braking using communications between a first control subsystem at a locomotive of the first train segment and a second control subsystem at a locomotive of the second train segment; and using a third control subsystem at a railcar adjacent the end of the first train segment for communicating a signal related to brake pipe pressure adjacent the end of the first train segment to the second control subsystem, and for controlling brake pipe pressure adjacent the end of the first train segment responsive to a command from the second control subsystem.

28. A method according to claim 23 wherein said second control subsystem and said third control subsystem cooperate so that the brake pipe pressure adjacent the end of the first train segment and a brake pipe pressure adjacent a front of the second train segment are substantially matching thereby emulating operation with a continuous brake pipe.

29. A method according to claim 23 further comprising the step of using the second control subsystem to command a brake pipe pressure reduction to the third control subsystem responsive to the first control subsystem.

30. A method according to claim 23 further comprising the step of using the third control subsystem to communicate a signal relating to a brake pipe pressure reduction in the first train segment to the second control subsystem when communication between the first control subsystem and second control subsystem is disrupted.

31. A method according to claim 30 further comprising the step of controlling motive power of the train using the first and second control subsystems; and further comprising the step of using the second control subsystem to cause the second locomotive to idle responsive to the brake pipe pressure reduction in the first train segment when communication between the first and second control subsystems is disrupted.

32. A method according to claim 23 further comprising the step of using the second control subsystem to command a brake pipe pressure reduction to the third control subsystem responsive to a reduction in brake pipe pressure in the second train segment and when communications between the first control subsystem and second control subsystem are disrupted.

33. A method according to claim 23 wherein the step of controlling the brake pipe pressure comprises the step of selectively releasing the brake pipe pressure.

* * * * *